United States Patent
Olund et al.

(10) Patent No.: US 11,454,828 B2
(45) Date of Patent: Sep. 27, 2022

(54) STABILIZED THIN LENS

(71) Applicant: HOYA Optical Labs of America Inc., Lewisville, TX (US)

(72) Inventors: David Olund, Stanchfield, MN (US); Justin Dodge, Star Prairie, WI (US)

(73) Assignee: HOYA Optical Labs Of America, Inc., Lewisville, TX (US)

( * ) Notice: Subject to any disclaimer, the term of this patent is extended or adjusted under 35 U.S.C. 154(b) by 0 days.

(21) Appl. No.: 14/809,093

(22) Filed: Jul. 24, 2015

(65) Prior Publication Data

US 2016/0026008 A1 Jan. 28, 2016

Related U.S. Application Data

(60) Provisional application No. 62/029,355, filed on Jul. 25, 2014.

(51) Int. Cl.
| | |
|---|---|
| *G02C 7/12* | (2006.01) |
| *G02B 7/02* | (2021.01) |
| *B29D 11/00* | (2006.01) |
| *B29C 45/00* | (2006.01) |
| *G02C 7/02* | (2006.01) |
| *B29L 11/00* | (2006.01) |

(52) U.S. Cl.
CPC ............ *G02C 7/12* (2013.01); *B29C 45/0003* (2013.01); *B29D 11/00432* (2013.01); *G02B 7/022* (2013.01); *G02C 7/02* (2013.01); *B29D 11/00923* (2013.01); *B29L 2011/0016* (2013.01)

(58) Field of Classification Search
CPC ...... B29C 45/0003; G02C 7/048; G02C 9/04; G02C 7/02; G02C 7/12; G02B 7/02

USPC ............ 351/159.56, 159.57, 159.6, 159.61, 351/159.62, 159.67, 159.73, 159.74, 351/159.75
See application file for complete search history.

(56) References Cited

U.S. PATENT DOCUMENTS

| | | | | |
|---|---|---|---|---|
| 2,361,589 | A * | 10/1944 | Bennett | G02C 7/06 156/106 |
| 4,090,830 | A * | 5/1978 | Laliberte | G02B 1/08 425/117 |
| 5,628,794 | A | 5/1997 | Lindstrom | |
| 5,805,263 | A * | 9/1998 | Reymondet | G02C 7/02 351/159.01 |
| 6,142,624 | A * | 11/2000 | Morris | G02C 7/02 351/159.19 |
| 6,390,621 | B1 | 5/2002 | Maki et al. | |
| 6,440,335 | B1 * | 8/2002 | Kingsbury | G02C 7/02 264/2.2 |

(Continued)

FOREIGN PATENT DOCUMENTS

| | | |
|---|---|---|
| CN | 101172389 A | 5/2008 |
| CN | 103167948 A | 6/2013 |

(Continued)

OTHER PUBLICATIONS https://www.engineersedge.com/heat_transfer/convection.htm (Year: 2021).*

(Continued)

*Primary Examiner* — Travis S Fissel
(74) *Attorney, Agent, or Firm* — Inskeep IP Group, Inc.

(57) ABSTRACT

A thin ophthalmic lens stabilized through incorporation of flange around all or a portion of a perimeter of the thin lens.

5 Claims, 4 Drawing Sheets

(56) References Cited

U.S. PATENT DOCUMENTS

| | | | |
|---|---|---|---|
| 7,900,280 B2 | 3/2011 | Thorpe et al. | |
| 8,651,660 B2 | 2/2014 | Barzak et al. | |
| 9,778,485 B2 | 10/2017 | Chiu et al. | |
| 2002/0050658 A1* | 5/2002 | Richard | B29D 11/0073 264/1.32 |
| 2002/0135735 A1* | 9/2002 | Yamamoto | B32B 7/02 351/159.56 |
| 2003/0017340 A1* | 1/2003 | Jiang | B29C 66/1122 428/412 |
| 2004/0099972 A1* | 5/2004 | Morris | B29C 45/561 264/1.32 |
| 2004/0261455 A1* | 12/2004 | Igari | C03C 17/22 65/24 |
| 2008/0231795 A1* | 9/2008 | Cartier | G02C 7/12 351/49 |
| 2008/0269890 A1* | 10/2008 | Simpson | A61F 2/1616 623/6.46 |
| 2009/0157179 A1* | 6/2009 | Pinto | A61F 2/16 623/6.11 |
| 2010/0141890 A1* | 6/2010 | Menta | B29D 11/0073 351/49 |
| 2010/0166978 A1* | 7/2010 | Nieminen | B29D 12/02 427/553 |
| 2010/0309430 A1* | 12/2010 | Haddadi | B24B 9/14 351/159.75 |
| 2011/0037945 A1* | 2/2011 | Wiand | B24B 9/14 351/159.67 |
| 2011/0085132 A1* | 4/2011 | Dubois | B24B 9/144 351/159.75 |
| 2011/0317431 A1* | 12/2011 | Ikenaga | C03B 11/10 362/311.05 |
| 2012/0075579 A1 | 3/2012 | Roffman et al. | |
| 2012/0140167 A1* | 6/2012 | Blum | G02C 7/04 351/159.34 |
| 2012/0182855 A1* | 7/2012 | Yamamoto | G11B 7/1374 369/112.23 |
| 2013/0184554 A1* | 7/2013 | Elsheikh | A61B 3/16 600/399 |
| 2013/0206328 A1* | 8/2013 | Chiu | B29C 63/16 156/212 |
| 2013/0255453 A1* | 10/2013 | Buck | B23B 31/307 82/1.11 |

FOREIGN PATENT DOCUMENTS

| | | | |
|---|---|---|---|
| WO | WO1999020171 A1 | 4/1999 | |
| WO | WO 2012/054046 A1 | 4/2012 | |

OTHER PUBLICATIONS

WIPO, International Search Report and Written Opinion for International Application No. PCT/US15/42128, dated Oct. 29, 2015, 10 pages.

European Patent Office, Examination Report dated Apr. 26, 2021 in European Patent Application No. 15824169.5, 6 pages.

* cited by examiner

STABILIZED THIN LENS

RELATED APPLICATIONS

This application claims priority to U.S. Provisional Application Ser. No. 62/029,355 filed Jul. 25, 2014 entitled Stabilized Thin Lens, incorporated herein by reference in its entirety.

FIELD OF THE INVENTION

The present application relates to optical lenses and, more particularly, molded optical lenses formed with a stabilizing feature that prevents warping of the lens after formation.

BACKGROUND OF THE INVENTION

Relatively thin, optical lenses, such as lenses ranging from 0.5 millimeters to 3.0 millimeters in thickness, are common in the market place, however, there are several challenges to the production of such lenses. For example, in certain circumstances, relatively thin, polymeric optical lenses tend to warp or otherwise lose their intended form when removed from the lens mold in which they were formed.

This problem is exacerbated in the case of thin, polarized, polymeric optical lenses. Polarized optical lenses are commonly produced by incorporating an absorptive polarizer formed by stretching a sheet of, for example, polyvinyl alcohol having iodine doping, into or on a base lens substrate. When a thin polymeric lens incorporating such a polarizer is removed from the lens mold, the stretched sheet attempts to regain its un-stretch form and thereby pulls and deforms the formed lens out of the lens's intended shape. This deformation can result in a lens having a "potato chip-like" or "saddle" shape. Lenses exhibiting such deformation are typically not acceptable in the market place. FIG. 1A is an example of such a deformed molded lens and FIG. 1B is an example of a non-deformed molded lens.

In order to overcome this problem, manufactures may attempt to cool the molded lenses within the mold for increased amounts of time in the hope of achieving increased lens stability at decreased temperatures. However, this technique has the obvious disadvantage of decreasing throughput of lens production.

What is needed in the art is a more effective means for stabilizing the molded form of a thin, polymeric lens after molding that does not impact production throughput.

OBJECTS AND SUMMARY OF THE INVENTION

The present invention provides an effective means for stabilizing a thin polymeric lens such that, after molding or formation, the thin polymeric lens will maintain the intended molded form and/or geometry. This objective is achieved through the formation of a flange around all or a portion of a perimeter of the thin lens.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1A:
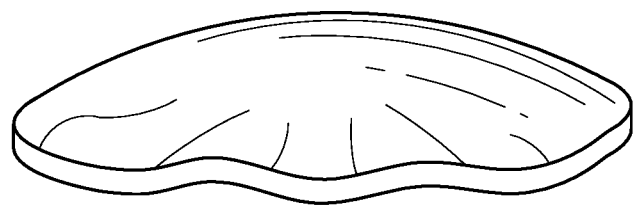
FIG. 1A is a perspective view of a deformed thin molded lens.
Figure 1B:
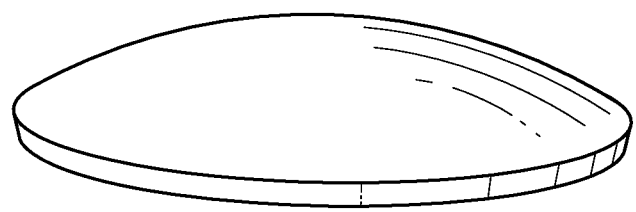
FIG. 1B is a perspective view of a non-deformed thin molded lens.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention provides an effective means for stabilizing a thin polymeric lens such that, after molding or formation, the thin polymeric lens will maintain the intended molded form or geometry. With reference to FIGS. 2A through 5, these objectives are, in part, achieved by molding the thin polymeric lens 10 such that the lens is formed with a stabilizing rim or flange 12 around the perimeter 14 of the molded lens 10.

The present invention is not limited by the polymeric material employed to form the thin lens 10. The polymeric substrate or material may be a thermoset material or a thermoplastic material. With respect to thermoset materials, the substrate may include polymers from diethylene glycol bis (allyl carbonate) or diallyl diglycol carbonate, such as CR-39® from PPG, or Akzo Nobel brands NS205, NS200 and NS207. The lens substrate may also comprise other thermoset materials such as polymers of 1,3 butylene glycol dimethacrylate, acrylonitrile, allyl methacrylate, ethoxymethyl methacrylate, ethylene glycol dimethacrylate, polyethylene glycol dimethacrylate; ally esters; co-polymers of allyl esters with styrene or vinyl type monomers, such as diallyl maleate, diallyl phthalate, methallyl methacrylate, and high index copolymers containing, e.g., vinyl functionality, isocyanates, urethanes, sulfur-containing aromatic vinyl compounds, and bromine-containing aromatic acrylic compounds.

With respect to thermoplastic materials, the substrate may comprise polycarbonate resin such as that sold by Teijin, Sabic, and Bayer, Inc. of Pittsburgh, Pa. under various tradenames. The lens substrate may also comprise other thermoplastic materials such as polyamides, polystyrenes, polysulphones, mixtures of polycarbonate and polyurethanes, polyesters, polysulfones, polystyrenes, amorphous polyolefins, and acrylics.

Figure 2A:
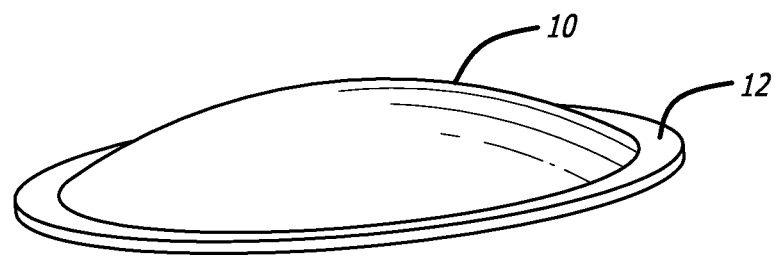
FIG. 2A is a perspective view of a flanged, thin, molded lens according to one embodiment of the present invention.
Figure 2B:
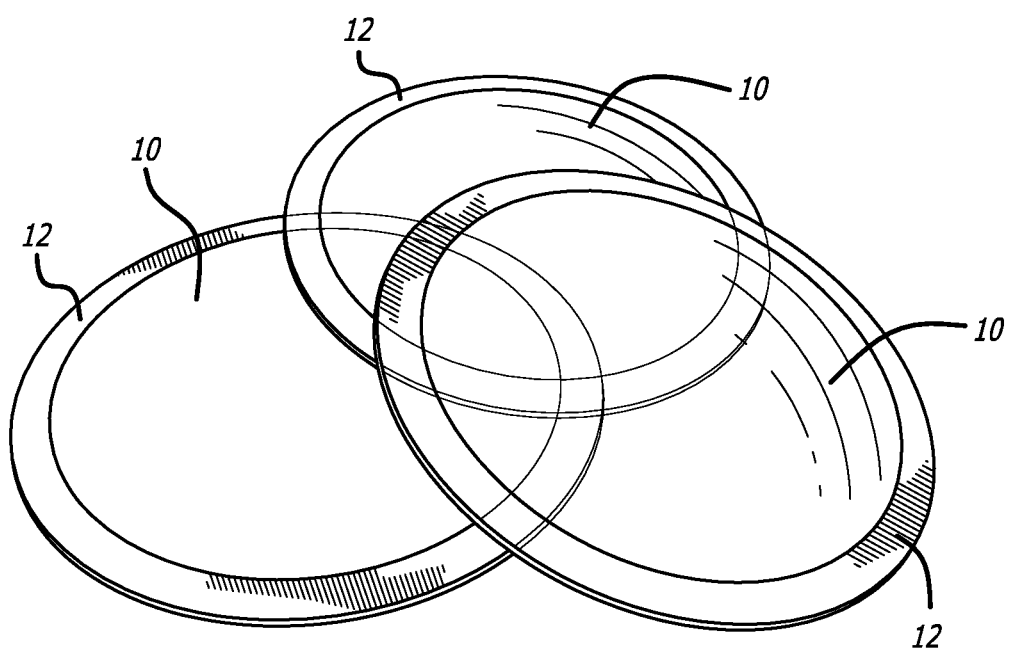
FIG. 2B is a perspective view of three flanged, thin, molded lenses according to one embodiment of the present invention.
Figure 3:
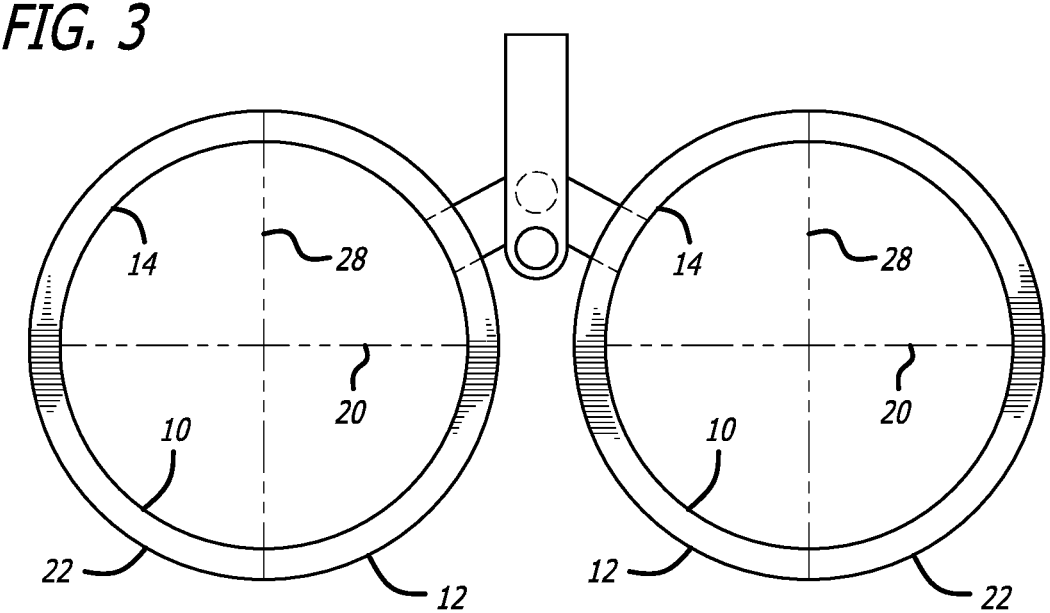
FIG. 3 is a plan view of a pair of flanged, thin, molded lenses according to one embodiment of the present invention.
Figure 4:
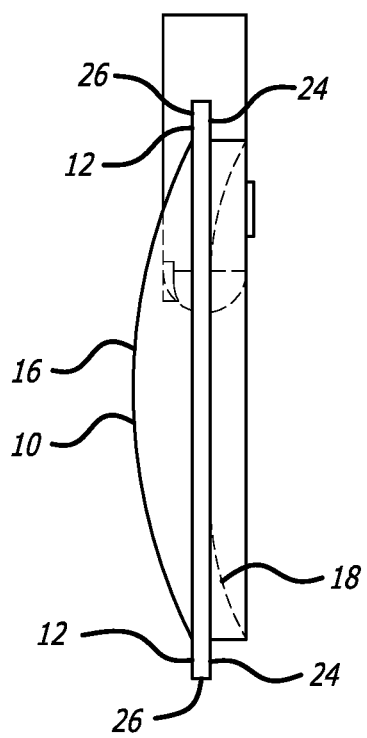
FIG. 4 is a side elevation view of a flanged, thin, molded lens according to one embodiment of the present invention.
Figure 5:
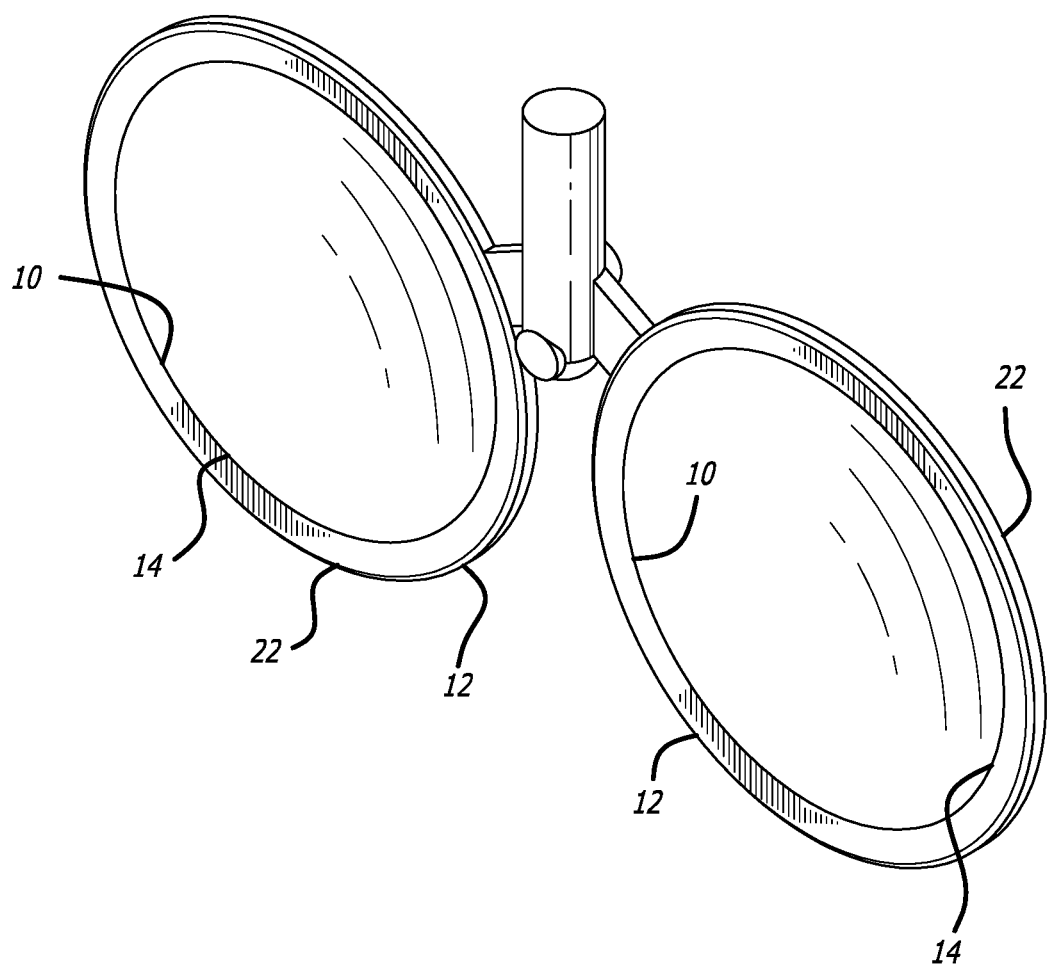
FIG. 5 is a perspective view of a pair of flanged, thin, molded lenses according to one embodiment of the present invention.

In certain embodiments of the present invention, as shown in FIG. 2A, the lens 10 is tinted or colored by including a dye or tinting agent within the lens substrate.

In certain embodiments of the present invention, the lens 10 is formed with a functional film or laminate incorporated within or on a front surface 16 or a back surface 18 of the thin lens 10. In certain embodiments, the functional laminate or film is incorporated solely within the perimeter 14 of the thin lens 10 and is not incorporated into the area of the flange 12. Alternatively, in certain embodiments, the functional laminate or film is incorporated within the area of the thin lens 10 as well as within all or a portion of the area of the flange 12. The functional attributes of the functional laminate may include, for example, tinting or coloration, anti-reflection, anti-fogging, hard coating, polarization, photochromism, and easy-cleaning.

In certain embodiments of the present invention, the thin lens 10 has an approximately uniform thickness between the front surface 16 and back surface 18 of 0.8 to 2.5 millimeters. In certain other embodiments of the present invention, the thin lens 10 has a non-uniform thickness between the front surface 16 and back surface 18 that ranges from approximately 0.8 to 2.5 millimeters.

In certain embodiments, the thin lens 10 of the present invention has a circular perimeter 14. The present invention is not limited by a diameter 20 of the thin lens 10. In certain embodiments, the diameter 20 of the thin lens 10 is approximately 65 to 85 millimeters. In certain embodiments, the diameter 20 of the thin lens 10 is approximately 75 millimeters.

In certain embodiments of the present invention, the flange 12 is formed uniformly or symmetrically around the perimeter 14 of the thin lens 10. For example, if the thin lens 10 has a circular form or perimeter 14, the flange 12 may also have a circular perimeter 22. In certain embodiments, a width of the flange 12 from the lens perimeter 14 to a perimeter 20 of the flange 12 is approximately 5 to 20 millimeters. For example, in the case of a thin lens 10 having a circular form and a diameter 20 of 75 millimeters and a symmetrical flange 12 having a diameter of 87.9 millimeters attached thereto, a width of the flange 12 would be approximately 12.9 millimeters.

Alternatively, in certain embodiments, the flange 12 is formed asymmetrically around the perimeter 14 of the lens 10. Alternatively stated, the width of the flange 12 from the lens perimeter 14 to a perimeter 20 of the flange 12 is not substantially constant and is variable.

In certain embodiments of the present invention, the flange has a thickness between a back surface 24 of the flange 12 and a front surface 26 of the flange 12 of approximately 0.5 to 3 millimeters. In certain embodiments, the thickness of the flange 12 will be less than a thickness of the lens 10 at perimeter 14. In certain embodiments, the thickness of the flange 12 will be greater than a thickness of the lens 10 at perimeter 14.

In certain embodiments of the present invention, the entire flange 12 is positioned within a plane that is the same as or parallel to a plane in which the lens 10 resides or the same as or parallel to a plane that represents a best fit plane through the lens 10. Alternatively, in certain embodiments of the present invention, the flange 12 is in a different, non-parallel plane than the plane in which the lens 10 resides or a different, non-parallel plane than a plane that represents a best fit plane through the lens 10.

In certain embodiments of the present invention, the interface or attachment point of the perimeter 14 of the lens 10 and the flange 12 forms a non-zero degree angle.

The flange 12 is formed, for example, during molding or casting of the lens 10 in a flanged or flangeless mold or cast set-up. The flange 12 may be formed of the same material or substrate as the lens 10, for example the flange 12 may be formed of polycarbonate. Alternatively, in certain embodiments of the present invention, the flange 12 is formed of a different material than that used to form the thin lens 10.

In practice, the flange 12 may be removed from the molded lens during processing of the thin lens 10. Alternatively, the thin lens 10 may be process without removing the flange 12. This may advantageously assist in protecting and maintaining the geometry of the thin lens 10 up to the point that the lens 10 associated with a lens frame of other structure that may assist in maintaining the geometry of the thin lens 10.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for stabilizing an ophthalmic thin eyeglass lens comprising:
   stretching a sheet of polarizing film onto a base lens substrate;
   placing the sheet of polarizing film and the substrate in a mold to form a round, unfinished, thin eyeglass lens with a functional film molded thereto, the thin eyeglass lens having a cylindrical edge and a flange defining a perimeter extending radially outward from the cylindrical edge, the flange having a uniform thickness that is greater than a thickness of the cylindrical edge of the thin eyeglass lens;
   removing the thin eyeglass lens from the mold; and
   edging the thin eyeglass lens so as to remove the flange and shape the thin eyeglass lens to fit a desired eyeglass lens frame.

2. The method of claim 1 wherein obtaining the thin eyeglass lens having the cylindrical edge defining the thickness of the perimeter and the flange extending radially outward from the cylindrical edge comprises obtaining a thin eyeglass lens formed by injection molding.

3. The method of claim 1 wherein obtaining the thin eyeglass lens having the cylindrical edge defining the thickness of the perimeter and the flange extending radially outward from the cylindrical edge comprises obtaining a thin eyeglass lens having a thickness of the cylindrical edge that is in a range of 0.8 to 2.5 millimeters.

4. The method of claim 1 wherein obtaining the thin eyeglass lens having the cylindrical edge defining the thickness of the perimeter and the flange extending radially outward from the cylindrical edge comprises obtaining a thin eyeglass lens comprising a functional laminate.

5. The method of claim 1 wherein obtaining the thin eyeglass lens having the cylindrical edge defining the thickness of the perimeter and the flange extending radially outward from the cylindrical edge comprises obtaining a thin eyeglass lens having a flange having a width of 5 to 15 millimeters.

* * * * *